United States Patent Office 3,173,087
Patented Mar. 9, 1965

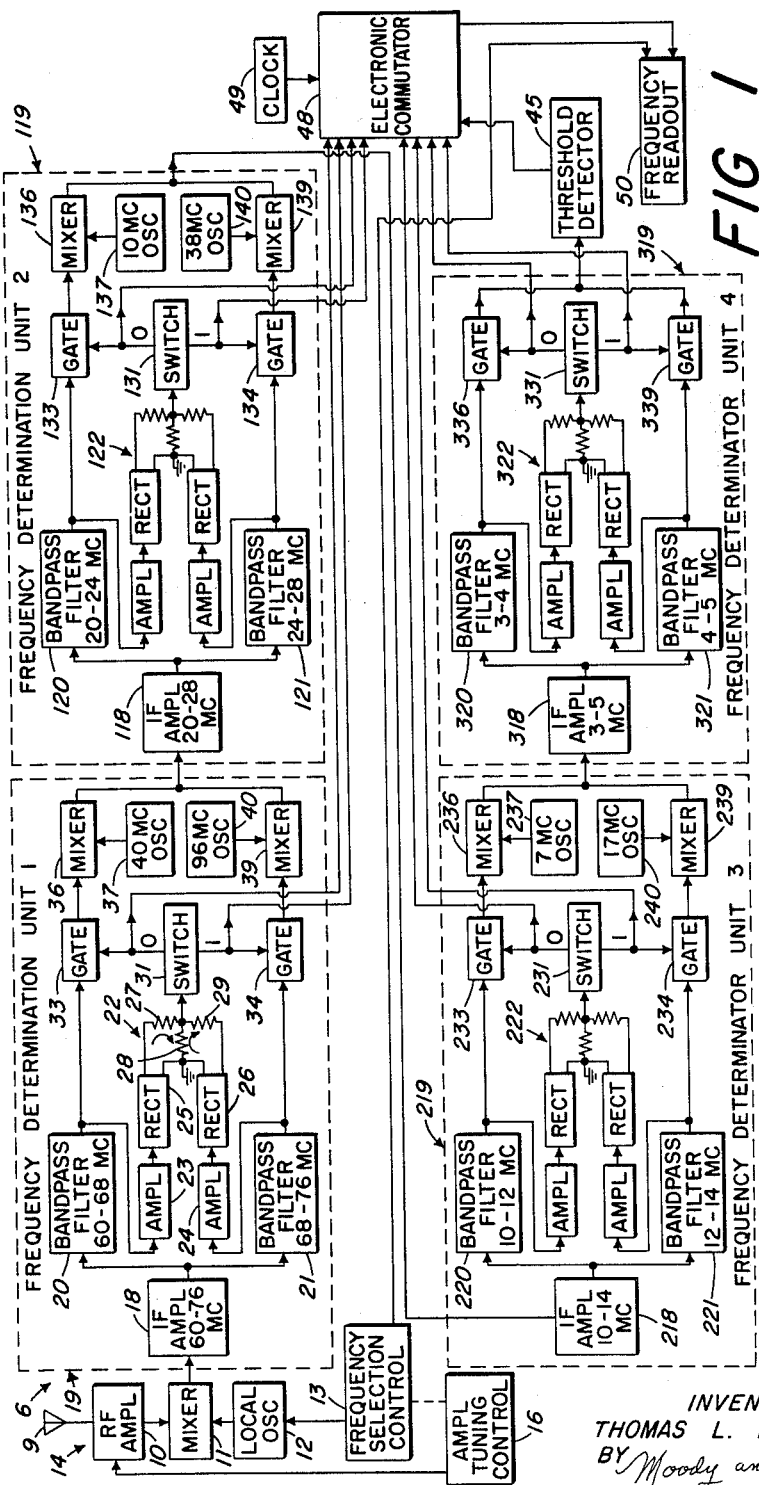

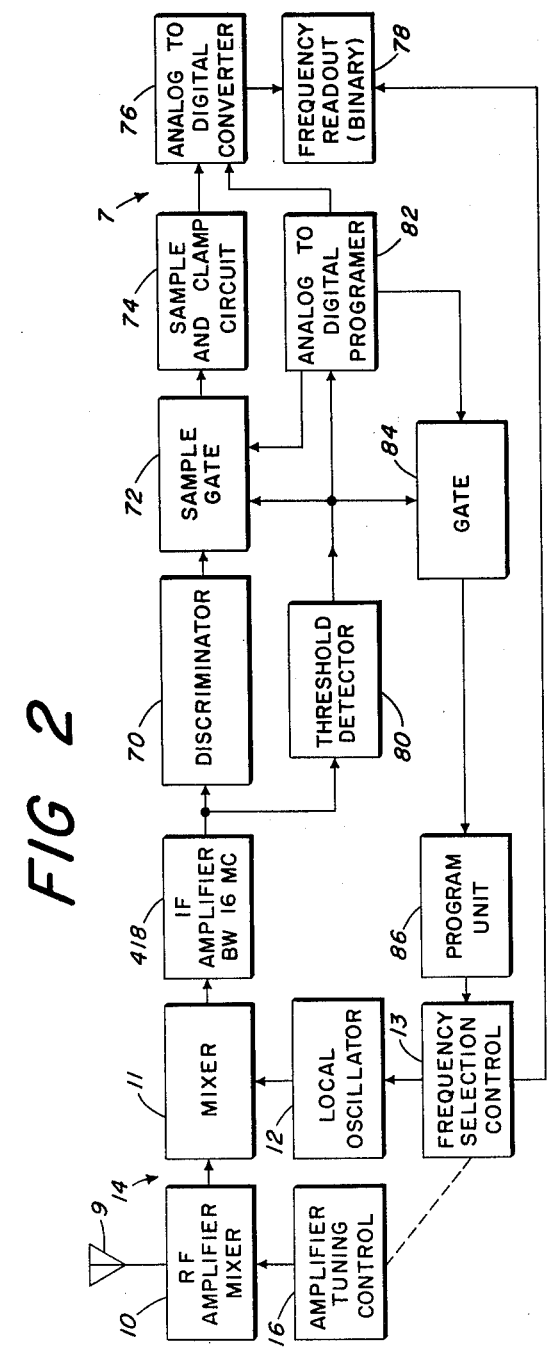

3,173,087
RADIO SEARCH AND INTERCEPT SYSTEM INCLUDING SERIALLY CONNECTED FREQUENCY DETERMINING UNITS WITH INCREASING PASSBANDS
Thomas L. Loposer, Dallas, Tex., assignor to Collins Radio Company, Cedar Rapids, Iowa, a corporation of Iowa
Filed Apr. 3, 1961, Ser. No. 100,140
9 Claims. (Cl. 324—79)

This invention relates to radio receiving systems and more particularly to a radio search and intercept system for simultaneously monitoring a broad frequency range and determining with good resolution the frequency of any intercepted signal in said range.

It is oftentimes found desirable to search for transmitted radio frequencies and to determine with good resolution the transmitting frequency of that signal. The problem of ferreting out a transmitted signal and then determining its frequency with good resolution, however, is complicated by the fact that the degree of resolution of the frequency of an interrupted signal is directly related to the narrowest bandwidth in the receiving system. Heretofore if the receiver bandwidth was made narrow enough to achieve good resolution, then the speed of search was necessarily reduced since it took a longer period of time to cover the desired frequency range. In fact, it may be shown that the search time required increases as the square of bandwidth reduction.

When utilizing a receiver with a narrow bandwidth to thereby achieve the desired good frequency resolution, searching has commonly been carried out heretofore by progressively scanning, mechanically or electrically, through each frequency range to be covered. While the scanning rate could be rapid, it was nevertheless time consuming to search any appreciable frequency range. In addition to being time consuming, however, each frequency in a given range could be monitored for only a very short period of time and this proved to be undesirable for ferreting out short "burst" type transmissions.

One possible solution for achieving faster search would be to broaden the bandwidth or passband of the receiver to enable simultaneous monitoring of a predetermined wide range of frequencies and thereby eliminate individual scanning of the frequency range. Such a system is shown, for example, by the patent to Henrici et al., No. 2,862,204, issued November 25, 1958. It is to be noted, however, that while faster search was achieved, it was achieved at the expense of good resolution in determining the frequency of the received signal since the device, as taught by Henrici et al., merely indicates that a signal existed within the monitored range.

It is, therefore, an object of this invention to provide a radio receiving system that can make a rapid spectrum search and still determine the frequency of a received signal with good resolution.

It is another object of this invention to provide a search and intercept system that can simultaneously monitor a broad frequency range and determine with good resolution the frequency of a received signal within said range.

It is a further object of this invention to provide a radio search and intercept system having receiver means providing a broad passband so that a wide range of frequencies can be simultaneously monitored, and means for determining with good resolution the frequency of any received signal found in the monitored range of frequencies.

It is still another object of this invention to provide a radio receiving system having means providing a broad passband to simultaneously monitor a wide range of frequencies, a series of decreasing bandwidth frequency determining units to determine whether a received signal in the monitored range is in the upper or lower half of the passband of each unit, and readout means connected to the frequency determining units for indicating the frequency of said received signal.

It is also an object of this invention to provide a radio receiving system having means providing a broad passband to simultaneously monitor a wide range of frequencies, a discriminator to develop a voltage proportional to the deviation of a received signal from the center frequency of said passband, and means responsive to the voltage developed to determine the frequency of a received signal within the monitored range of frequencies.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be submitted as come within the scope of the claims.

The accompanying drawings illustrate two complete examples of the embodiments of the invention according to the best mode so far devised for the practical application of the principles thereof, and in which:

FIGURE 1 is a block diagram illustrating one embodiment of the radio receiving intercept system of this invention; and FIGURE 2 is a block diagram illustrating a second embodiment of the radio receiving intercept system of this invention.

Referring now to the drawings in which like numerals have been used for like characters throughout, the numeral 6 indicates generally one embodiment of the radio receiving system of this invention while the numeral 7 indicates generally a second embodiment of the radio receiving system of this invention.

As shown in FIGURES 1 and 2, transmitted radio signals may be received through omnidirectional antenna 9 and coupled through a conventional RF amplifier 10 to a conventional mixer 11. Mixer 11 may also receive a second input from a conventional local oscillator 12.

The output frequency of local oscillator 12 is controlled by frequency selection control 13, which may also be conventional, so that the output frequency is varied only in predetermined increments depending upon the range of frequencies to be simultaneously monitored. As shown and described herein, the passband of the monitoring, or front receiving section 14, is 16 megacycles and, therefore to assure complete coverage, local oscillator 12 is stepped in 16 megacycle increments. It is to be appreciated, of course, that while the passband is shown and described herein as having a 16 megacycle width this invention is not meant to be limited to a system wherein the frequency range to be simultaneously monitored must necessarily be 16 megacycles. The passband of monitoring section 14 could be broader or narrower, as desired, and such a modification would not depart from the teachings of this invention.

As shown in FIGURES 1 and 2, frequency selection control 13 can, if desired, be constrained to operate in conjunction with amplifier tuning control 16 to preclude an ambiguous difference frequency from being coupled from mixer 11. Amplifier tuning control 16, if provided, may be conventional, and preferably operates to block any signal outside of the range of frequencies to be monitored.

As shown in FIGURE 1, the output from mixer 11 may be coupled to IF amplifier 18, which amplifier is tuned to pass a difference frequency and is a part of a first frequency determining unit 19. IF amplifier 18 may be conventional and preferably has a substantially flat response over a passband substantially equal to the increment variations of the frequency output of local oscillator 12. The passband of IF amplifier 18, in fact, determines the frequency range simultaneously monitored and by varying the output frequency of local oscillator 12 by increments equal to this passband, progressive monitoring of several frequency ranges may be accomplished in a period of time obviously much smaller than that required to individually scan each frequency of each range.

As shown in FIGURE 1, IF amplifier 18 has a bandwidth of 16 megacycles and passes a frequency range between 60 and 76 megacycles. The output from IF amplifier 18 may be split into two electrical branches, which branches include bandpass filters 20 and 21. Bandpass filter 20 passes the lower half of the passband of IF amplifier 18 (60 to 68 megacycles) while bandpass filter 21 passes the upper half of the passband of amplifier 18 (68 to 76 megacycles).

A sensing circuit 22 is provided to determine through which filter a received signal is coupled. This sensing system may comprise amplifiers 23 and 24 connected to the output of filters 20 and 21, respectively, and rectifiers 25 and 26 connected to the output of amplifiers 23 and 24 respectively. The output from rectifier 25 is applied through serially connected resistors 27 and 28, while the output of rectifier 26 is applied through serially connected resistors 29 and 28. Rectifiers 25 and 26 are connected in opposition, and hence current flow through resistor 28 will be in one direction due to rectifier 25 and in the opposite direction due to rectifier 26. This, of course, will serve to balance out the noise and makes the receiver reliable even in the presence of a rather weak signal, reliable operation requiring only a signal to noise level of 2 db. This current flow is then utilized to control electronic switch 31, which although not specifically shown, is assumed to include a conventional circuit such as, for example, a Schmitt Trigger to sense the polarity of the voltage across resistor 28 and provide switching action to supply a voltage for operation of electronic gate 33 or 34. Gates 33 and 34 may be conventional and may, for example, be diode or transistor gates, and are connected to bandpass filters 20 and 21 respectively. Electronic switch 31 controls gates 33 and 34 so that the gate connected to the bandpass filter through which a signal is coupled will be opened while the other gate will remain closed to preclude coupling from the other bandpass filter. Electronic switch 31 is also connected to electronic commutator 48 for purposes to be brought out hereinafter.

The output from bandpass filter 20 may be coupled through gate 33 to mixer 36, which mixer also receives an injected frequency from oscillator 37 below that of the passband of filter 20. In like manner, the output from bandpass filter 21 may be coupled through gate 34 to mixer 39, which mixer also receives an injected frequency from oscillator 40 that is above the passband of filter 21. If the IF amplifier passes a frequency of 60 to 76 megacycles, as shown in FIGURE 1, then an injected frequency to mixer 36 would be 40 megacycles while the injected frequency to mixer 39 would be 96 megacycles.

As should be readily apparent, the purpose of mixers 36 and 39 is to provide a common difference frequency range which can then be coupled from either mixer to a second frequency determining unit 119 to further divide the frequency range in order to obtain good resolution in frequency determination.

The outputs from mixers 36 and 39 are coupled to an IF amplifier 118 of second frequency determining unit 119, which unit may be identical to the first frequency determining unit except that the frequencies are correspondingly lower, the passband now being 8 megacycles.

As shown in FIGURE 1, IF amplifier 118 may pass the frequency range between 20 and 28 megacycles and the amplifier, of course, may be conventional. The output from amplifier 118 is coupled through filters 120 and 121, and the signal is sensed by sensing means 122 identical to sensing means 22 of first determining unit 19. The outputs from filters 120 and 121 are then coupled through gates 133 and 134 to mixers 136 and 139, respectively, which mixers have, of course, proper injected frequencies from oscillators 137 and 140, respectively, in the same manner as described hereinabove with respect to first frequency determining unit 19. As shown in FIGURE 1, oscillator 137 may provide a 10 megacycle output frequency, while oscillator 140 may provide a 38 megacycle frequency.

The output from second frequency determining unit 119 may then be coupled to third frequency determining unit 219 which unit has a 4 megacycle passband. As shown in FIGURE 1, third frequency determining unit 219 may have an IF amplifier 218 to pass a frequency range between 10 and 14 megacycles and its output may be connected to filters 220 and 221, the former of which passes the lower half of the 4 megacycle band, while the latter passes the upper half of the band. Again the outputs from filters 220 and 221 are sensed by sensing means 222 identical to sensing means 22 in determining unit 19 and the output is applied through gates 233 and 234 to mixers 236 and 239 respectively. The mixers have again an injected frequency from oscillators 237 and 240, respectively, below and above the filter passband. As shown in FIGURE 1, this injected frequency may be 7 megacycles to mixer 236 and 17 megacycles to mixer 239.

To resolve the frequency to one megacycle a fourth frequency determining unit 319 may be utilized to accept the signal from mixers 236 and 239. This unit, of course, will have a passband of only two megacycles. IF amplifier 318 having a two megacycle passband (passing 3 to 5 megacycles as shown in FIGURE 1) will accept the signal and couple it to filters 320 and 321 each of which have a passband of one megacycle with the former passing the lower half and the latter passing the upper half of the passband. A sensing unit 322 is again utilized to sense the output of filters 320 and 321 and the filter output is passed through gates 336 and 339 to the output of the determining unit in the same manner as described hereinabove with respect to the other frequency determining units.

The output from frequency determining unit 319 is coupled to a threshold detector 45 which detector may be conventional and provides an output which may be coupled to electronic commutator 48 to trigger the same only after receiving a transmitted signal. Each of the switches of the sensing means (22, 122, 222, and 322) may also be electrically connected to electronic commutator 48 so that the commutator, which may be driven by clock 49, by sensing the position of each switch can, in conventional fashion, produce an output gray code signal after being triggered by threshold detector 45. This signal is then applied to a conventional readout means 50 where the frequency of the received signal is indicated. If desired, a parallel readout, rather than the serial readout provided by the commutator, may be provided by connecting each of the switches of the sensing means directly to frequency readout means 50. Threshold detector 45 would, of course, likewise be directly connected to frequency readout 50 to trigger the readout.

Frequency readout means 50 may be a conventional digital readout and could, for example, when used with a commutator, include typewriter, teletype, paper tape punch or card punch. Likewise, if no commutator is utilized, a visual digital readout may be used, such as, for example, similar to readout means for frequency counters or digital voltmeters. To indicate the frequency of a received signal, frequency readout means 50 is also connected with frequency selection control 13 so that information as to the frequency range monitored may be integrated into the readout device so that the final readout indicates the frequency of the received signal.

In operation, the local oscillator 12 is stepped by increments such that a definite spectrum of frequencies may be monitored by predetermined ranges. In other words, if the passband of receiver section 14 is 16 megacycles, then all frequencies within the selected 16 megacycle frequency range are monitored simultaneously. The oscillator will then be caused to step, or vary, by a 16 megacycle increment so that all of the frequencies in an adjacent 16 megacycle frequency range are then simultaneously monitored.

When a signal is received in the monitored range of frequencies, this signal is fed to mixer 11 where it beats with the output frequency of local oscillator 12 and a difference output frequency is selected by first frequency determining unit 19 and more particularly by the IF amplifier and filters therein. If the signal is 701 megacycles, for example, and the local oscillator is at 640 megacycles and providing low side injection, a difference frequency of 61 megacycles will be passed through IF amplifier 18.

The 61 megacycle frequency, being in the lower half of the passband, will be passed by filter 20 and switch 31 of sensing means 22 will cause gate 33 to open to allow the signal to be coupled to mixer 36. The 61 megacycle signal will then beat with the injected 40 megacycle frequency and a difference frequency of 21 megacycles will be coupled to second frequency determining unit 119.

Since the 21 megacycle frequency is within the lower half of the accepted 8 megacycle passband, it will be coupled through filter 120 and switch 131 of sensing means 122 will cause gate 133 to open and pass the 21 megacycle signal to mixer 136. In mixer 136, the 21 megacycle signal will beat with the 10 megacycle injected frequency and a 11 megacycle difference frequency will be coupled to frequency determining unit 219.

In frequency determining unit 219, the 11 megacycle signal will be coupled through filter 220 (which passes 10 to 12 megacycles), and gate 233 (which is opened by switch 231 of sensing means 222) to mixer 236. There the 12 megacycle signal will be mixed with a 7 megacycle injected frequency and coupled to the last frequency determining unit 319.

In frequency determining unit 319, the signal will pass through either filter 320 or 321 depending upon whether the received signal is slightly less or more through an exact 4 megacycles, and switch 331 will open gate 336 or 339 to pass the signal to threshold detector 45.

Electronic commutator 48 will then be triggered by threshold detector 45 to four switches 31, 131, 231 and 331 and provides a gray code output signal, in conventional fashion, which may be used for readout by readout device 50 to indicate the frequency of the received signal within one megacycle. Thus, when switch 31 opened gate 339 to allow a signal to be coupled to threshold detector 45 to thereby trigger commutator 48, the commutator sensed the position of switches 31, 131, 231 and 331 and found them as follows:

Switch: Position
31 _____ 0
131 _____ 0
231 _____ 0
331 _____ 1

The binary number read by the commutator then would be 0001 which corresponds to the decimal number one, and which, of course, indicates the signal to be one megacycle above the lower end of the frequency range monitored.

The following is a table of frequency (input), switch position, and gray code output for the 16 megacycle monitored frequency range:

| Input Frequency | Switch Position | | | | Gray Code | Decimal Equivalent |
|---|---|---|---|---|---|---|
| | 31 | 131 | 231 | 331 | | |
| 60–61 | 0 | 0 | 0 | 0 | 0000 | 0 |
| 61–62 | 0 | 0 | 0 | 1 | 0001 | 1 |
| 62–63 | 0 | 0 | 1 | 1 | 0011 | 2 |
| 63–64 | 0 | 0 | 1 | 0 | 0010 | 3 |
| 64–65 | 0 | 1 | 1 | 0 | 0110 | 4 |
| 65–66 | 0 | 1 | 1 | 1 | 0111 | 5 |
| 66–67 | 0 | 1 | 0 | 1 | 0101 | 6 |
| 67–68 | 0 | 1 | 0 | 0 | 0100 | 7 |
| 68–69 | 1 | 1 | 0 | 0 | 1100 | 8 |
| 69–70 | 1 | 1 | 0 | 1 | 1101 | 9 |
| 70–71 | 1 | 1 | 1 | 1 | 1111 | 10 |
| 71–72 | 1 | 1 | 1 | 0 | 1110 | 11 |
| 72–73 | 1 | 0 | 1 | 0 | 1010 | 12 |
| 73–74 | 1 | 0 | 1 | 1 | 1011 | 13 |
| 74–75 | 1 | 0 | 0 | 1 | 1001 | 14 |
| 75–76 | 1 | 0 | 0 | 0 | 1000 | 15 |

The information from commutator 48 is utilized in frequency readout means 50, along with information from frequency selection control 13 concerning the range actually being monitored, to then indicate the frequency of the received signal.

It is to be appreciated that the frequency determining units increase as a binary multiple and hence by adding a unit, or deleting a unit, the range of frequencies to be simultaneously monitored can be doubled or halved without departure from the teachings of this invention. The frequency range simultaneously monitored, however, should not be so great as to cause two or more signals to appear in the same monitored range since the system of this invention will indicate the frequency of the stronger system and ignore the weaker signal. However, it is not felt to be unrealistic to provide simultaneous monitoring of between 16 megacycles and 1024 megacycles in the transmitter range from 500 megacycles to 40 kilo-megacycles, for example, where pulse signals predominate.

It is also to be appreciated that the injected and IF frequencies shown and described herein are illustrative of one embodiment of this invention, and that the scope of the invention is not meant to be limited thereby.

As shown by the embodiment designated as FIGURE 2, a signal may be received and mixed in the same manner as described with respect to FIGURE 1. Likewise the output from mixer 11 may be applied to IF amplifier 418 which amplifier, like amplifier 18, may have a 16 megacycle passband providing, of course, that it is desirable to search in 16 megacycle steps.

The output from IF amplifier 418 may, in the embodiment shown in FIGURE 2, however, be applied to a conventional discriminator 70, which discriminator is tuned to the center frequency of the passband of amplifier 418 to indicate a frequency deviation from the center of the passband. As is well known in the art, if this deviation is below the center frequency, a negative voltage will be developed while, if above, a positive voltage will be developed, and in both cases, the magnitude will be dependent upon the amount of deviation.

The voltage developed by discriminator 70 is coupled through normally closed sample gate 72 to a conventional sample and clamp circuit 74 which clamps and holds the input voltage level for a predetermined period of time so that a conventional analog to digital converter 76 digitizes the clamped voltage to provide a binary output (which is a representation of frequency since the amplitude of the voltage from discriminator 70 was proportional to frequency) for use by conventional readout device 78 to indicate the frequency of the received transmitted signal. To insure that the output voltage sample from the discriminator is taken only when a signal is being received, sample gate 72 is normally closed except when opened by a signal from threshold detector 80, which detector is connected to IF amplifier 418 to detect the presence of a received signal.

Threshold detector 80 also provides a trigger output to program unit 82, which program unit controls the operation of converter 76. Program unit 82 may be conventional and in essence is a type of logic machine designed to sequence through a prescribed series of functions after being triggered.

The speed of search is limited by the speed of the analog to digital conversion. Since present conventional analog to digital units run at a speed of approximately 600,000 bits per second, or 1.6 microseconds per bit, and since a one part in 16 resolution would provide a 4 bit binary output, 6.7 microseconds are required to provide a readout. However, minimum detection for a 16 microsecond bandwidth is only 0.05 microsecond. Program unit 82 must, therefore, prevent a second signal from being fed to the converter until the readout is accomplished.

This is done by closing gate 72 between discriminator 70 and clamping circuit 74 at the same time that the converter is triggered. In addition, a signal is sent to gate 84. If a second transmitted signal is received while the converter is still operating, threshold detector 80 supplies a gate opening signal to gate 84 so that a holding command may be sent to a second program unit 86, which may also be conventional.

Program unit 86 is utilized to automatically cause local oscillator 12 to periodically step. Thus to prevent losing a received signal while the converter is digitizing a first signal, program unit 86 operates to hold the local oscillator frequency constant and thereby continue to monitor the range in the second signal appeared until the converter is again ready to accept, and does accept, the new signal for digitizing.

In operation, when a signal is received that is within the frequency range monitored, say, for example, 701 megacycles, and the local oscillator is at 640 megacycles, a difference signal may be coupled through amplifier 418 (providing the amplifier accepts a 60 to 76 megacycle range, of course) and this signal is applied to discriminator 70. Since dicriminator 70 is set to the center frequency of the IF amplifier, a negative voltage proportional to the distance from the center frequency (in this case, 7 megacycles) is produced. This voltage is coupled through gate 72 (providing converter 76 is not operating and is ready to receive a signal) to clamping circuit 74 where the voltage level is clamped and held in conventional fashion for a period of time necessary for operation of converter 76 (which, as brought out herein, is 6.7 microseconds).

Converter 76 accepts the voltage and converts the same from analog to digital form (after being triggered by program unit 82) and sends out a binary signal to readout device 78. Readout device 78 also receives an indication of the frequency range monitored from frequency selection control 13 so that the indication given is that of the frequency of the received signal.

Although the embodiment of FIGURE 2 shown and described herein illustrates the receiving system of this invention as having a passband of 16 megacycles to simultaneously monitor a 16 megacycle frequency range, it will be appreciated, of course, that the simultaneously monitored frequency range can be varied in accordance with the teachings of this invention and that the invention is not meant to be limited to simultaneous monitoring of any particular frequency range.

Resolution of the embodiment of this invention shown in FIGURE 2 is limited only by the linearity of the discriminator (which, at present, for conventional discriminators is about 1 part in 400), the analog to digital converter (which, at present, for conventional converters is of this type is about 1 part in 2000), and the sensitivity of the receiver and particularly the threshold detector therein (which for a 16 megacycle monitored frequency receives a proportionately greater noise input than a receiver with a narrower one megacycle input). As a result of the last mentioned limitation, a 12 db stronger signal is required for effective operation of this embodiment.

It should be evident from the foregoing that the radio receiving system of this invention provides a means for simultaneously monitoring a broad range of frequencies without sacrificing good resolution in determining the frequency of a received signal within the monitored frequency range.

What is claimed as my invention is:

1. A radio receiving system, comprising: means for simultaneously monitoring a predetermined wide range of frequencies and for receiving a transmitted signal having a frequency within said range; a plurality of serially connected frequency determining units having passbands which progressively increase unit by unit as a binary multiple, said unit with the broadest passband being connected to said first named means, and each of said units having sensing means to determine whether said signal is in the upper or lower half of the passband of said unit; mixing means coupling adjacent frequency determining units so that a received signal coupled from said unit with the broader passband is always within the passband of the unit with the narrower passband; and readout means connected with said sensing means for indicating the frequency of said received signal.

2. The receiving system of claim 1 wherein each of said sensing means includes a pair of bandpass filters one of which is tuned to pass the upper half of the passband of said unit and the other of which is tuned to pass the lower half of the passband of said unit, said sensing means also including means connected to said bandpass filter to indicate the filter through which a received signal is coupled.

3. The receiving system of claim 2 further characterized by the fact that each said means to indicate the bandpass filter through which a received signal is coupled includes a pair of rectifiers for developing opposing direct voltages from each said bandpass filter, impedance means connected to both said rectifiers to compare said voltages, and switch means connected to said impedance means and actuated by said voltages to assume a predetermined position depending upon the polarity of the same whereby said readout means by examining the positions of said switch means can indicate the frequency of said received signal.

4. A radio receiving system for monitoring a wide frequency spectrum and determining the frequency of transmitted signals in said spectrum, said system comprising: antenna means for receiving transmitted signals; a mixer for receiving said transmitted signals from said antenna means; an oscillator for providing a second input to said mixer; a plurality of serially connected frequency determining units each of which has a pair of passband filters one of which passes the upper half of the passband of said unit and the other of which passes the lower half of the passband of said unit, said units having passbands that progressively increase unit by unit as a binary multiple, said unit having the broadest passband being connected to said mixer for selecting a predetermined difference output therefrom; mixing means connected between adjacent frequency determining units so that a received signal coupled therebetween is always within the passband of the units; each said frequency determining unit having sensing means for determining through which passband filter said received signal is coupled, and gate means connected to said sensing means for coupling said received signal to said mixing means; a threshold detector connected to the frequency determining unit having the narrowest bandpass to sense the presence of a received signal; and means triggered by said threshold detector and connected to said sensing means for indicating the frequency of a received signal.

5. A radio receiving system for monitoring a wide frequency spectrum and determining the frequency of transmitted signals in said spectrum, said system comprising: an antenna; a mixer connected with said antenna; an oscillator for injecting a reference frequency to said mixer; means for controlling the output frequency of said oscillator so that said frequency is varied in predetermined increments; a plurality of frequency dividing units each of which has a first passband filter to pass the upper half of the passband of said unit, a second filter to pass the lower half of the passband of said unit, a first rectifier connected to said first passband filter for developing a direct voltage when a signal passes through said first passband filter, a second rectifier connected to said second passband filter for developing a direct voltage when a signal passes through said second passband filter, impedance means connected to both said rectifiers with said rectifiers being oppositely poled, and a switch the positioning of which is dependent upon direction of current flow through said impedance means to indicate the filter through which said signal is being coupled, said frequency dividing units being serially connected and having passbands which are progressively narrower by a binary function, said unit with the widest passband being connected to said mixer for selecting a difference frequency therefrom and having a passband substantially equal to the incremental frequency variations of said oscillator; gate means connected to said passband filters and said switches to block an output from each said passband filter except when a signal is received; mixing means connecting each adjacent pair of dividing units and receiving an injected frequency so that a received signal coupled from said unit with the broader passband is always within the passband of the unit with the narrower passband; a threshold detector for receiving the output signal from the frequency dividing unit with the narrowest passband, said threshold detector producing an output whenever a received signal is coupled through said frequency dividing units to said detector; and means triggered by said threshold detector and connected to said switches to sense the positions thereof to thereby indicate the frequency of a received signal coupled through said receiver.

6. A radio receiving system for monitoring a wide frequency spectrum and determining the frequency of transmitted signals in said spectrum, said system comprising: an antenna; a first mixer having a pair of inputs and an output, said antenna being connected to one said input; an oscillator connected to the other input of said first mixer; oscillator frequency control means to vary the oscillator output frequency by 16 megacycle increments; a first IF amplifier connected to the output of said first mixer and tuned to pass a frequency spectrum between 60 and 76 megacycles; a first bandpass filter connected to said first IF amplifier and tuned to pass a frequency range between 60 and 68 megacycles; a second bandpass filter connected to said first IF amplifier and tuned to pass a frequency range between 68 and 76 megacycles; first sensing means for sensing whether a received signal is coupled through said first or said second filter; a second mixer connected to said first bandpass filter, said second mixer having an injected 40 megacycle reference signal; a third mixer connected to said second bandpass filter, said third mixer having an injected 96 megacycle reference signal; a second IF amplifier connected to said second and third mixers and tuned to pass a frequency range between 20 and 28 megacycles; a third bandpass filter connected to said second IF amplifier and tuned to pass a frequency range between 20 and 24 megacycles; a fourth bandpass filter connected to said second IF amplifier and tuned to pass a frequency range between 24 and 28 megacycles; a second sensing means for sensing whether a received signal is coupled through said third or fourth filters; a fourth mixer connected to said third bandpass filter, said fourth mixer having an injected 10 megacycle reference frequency; a fifth mixer connected to said fourth bandpass filter, said fifth mixer having an injected 38 megacycle reference frequency; a third IF amplifier connected to said fourth and fifth mixers and tuned to pass a frequency range between 10 and 14 megacycles; a fifth bandpass filter connected to said third IF amplifier and tuned to pass a frequency range between 10 and 12 megacycles; a sixth bandpass filter connected to said third IF amplifier and tuned to pass a frequency range between 12 and 14 megacycles; third sensing means for sensing whether a received signal is coupled through said fifth or sixth filters; a sixth mixer connected to said fifth bandpass filter, said sixth mixer having an injected 7 megacycle reference frequency; a seventh mixer connected to said sixth bandpass filter, said seventh mixer having an injected 17 megacycle reference frequency; a fourth IF amplifier connected to said sixth and seventh mixers and tuned to pass a frequency range between 3 and 5 megacycles; a seventh bandpass filter connected to said fourth IF amplifier and tuned to pass a frequency range between 3 and 4 megacycles; an eighth bandpass filter connected to said fourth IF amplifier and tuned to pass a frequency range between 4 and 5 megacycles; fourth sensing means for sensing whether a received signal is coupled through said seventh or eighth filters; a threshold detector connected to said seventh and eighth filters said detector being responsive to a received signal to produce an output; an electronic commutator connected to said threshold detector to be triggered by said detector whenever an output signal is coupled therefrom, said commutator also being connected to said sensing means to provide an output determined by the filters utilized to couple a received signal to said threshold detector; and readout means for receiving the output from said commutator and indicating the frequency of a receiver signal within one megacycle.

7. In a receiving system for monitoring a wide frequency spectrum and determining the frequency of a received signal in said spectrum, a frequency determining unit, comprising: an IF amplifier having a predetermined passband; a first filter having a passband equal to the upper half of the passband of said amplifier; a second filter having a passband equal to the lower half of the passband of said amplifier; a first rectifier connected to said first filter and developing a direct voltage when a received signal is coupled through said first filter; a second rectifier connected to said second filter and developing a direct voltage when a received signal is coupled through said second filter; impedance means connected to said rectifiers so that current flow from one opposes the other; and switch means responsive to said current flow to indicate the filter coupling said received signal.

8. A radio receiving system for monitoring a wide frequency spectrum and determining the frequency of transmitted signals in said spectrum, said system comprising: antenna means for receiving transmitted signals; a mixer connected to said antenna means; an oscillator for providing a second input to said mixer; an IF amplifier for selecting a difference frequency from said mixer, said IF amplifier having a substantially flat and predetermined broad passband; a discriminator for developing a voltage the magnitude of which depends upon the deviation of a received signal from the center frequency of the passband of said IF amplifier; a threshold detector connected to said IF amplifier; a gate for receiving the output from said discriminator, said gate also being connected to said threshold detector and being opened thereby whenever a received signal is coupled through said IF amplifier; a sample and clamp circuit for receiving the voltage from said discriminator through said gate and maintaining said voltage for a predetermined interval of time; a converter for converting said voltage to digital form within said predetermined interval of time; and readout means for receiving the output from said converter and indicating the frequency of said received signal.

9. A radio receiving system for monitoring a wide frequency spectrum and determining the frequency of transmitted signals in said spectrum, said system comprising: antenna means for receiving transmitted signals; a mixer connected to said antenna means; an oscillator for providing a second input to said mixer; oscillator control means for varying the output frequency of said oscillator by predetermined increments; an IF amplifier having a substantially flat and predetermined broad passband substantially equal to said predetermined increments; a discriminator for developing a voltage the magnitude of which depends upon the deviation of a received signal from the center frequency of the passband of said IF amplifier; a threshold detector connected to said IF amplifier and being responsive only to received transmitted signals to produce an output; a gate connected to said discriminator and to said threshold detector whereby said gate is opened in response to an output from said threshold detector; a sample and clamp circuit connected to said gate for receiving the voltage developed by said discriminator due to a received signal and maintaining the voltage for a predetermined amount of time; an analog to digital converter connected to said sample and clamp circuit to receive the output therefrom; a first program unit connected to said threshold detector to sense the receipt of a transmitted signal and to said converter to trigger the same, said program unit also being connected to said gate to close the same after a signal is received for a predetermined time interval at least equal to the time interval necessary for converter operation; readout means for receiving the output from said converter and indicating the frequency of said received signal; and a second program unit for causing said oscillator to vary by increments to thereby permit progressive searching of frequency ranges, said second program unit being connected to said first program unit whereby said oscillator output frequency is maintained substantially constant while said converter is operating in response to a received signal.

References Cited by the Examiner

UNITED STATES PATENTS

| | | | |
|---|---|---|---|
| 2,131,559 | 9/38 | Granger | 324—79 |
| 2,159,790 | 5/39 | Freystedt | 324—77 |
| 2,358,028 | 9/44 | Peterson. | |
| 2,535,442 | 12/50 | McLaughlin | 250—20.52 XR |
| 2,602,836 | 7/52 | Foster et al. | 324—77 |
| 2,619,590 | 11/52 | Williams. | |
| 2,630,525 | 3/53 | Tomberlin | 250—20.52 XR |
| 2,685,648 | 8/54 | Budelman | 324—79 XR |
| 2,753,524 | 7/56 | Newsom | 324—79 XR |
| 2,877,344 | 3/59 | Dodington | 324—79 XR |
| 2,991,416 | 7/61 | Ramp et al. | 324—79 |
| 2,999,205 | 9/61 | Sichak et al. | 324—77 XR |

WALTER L. CARLSON, *Primary Examiner.*

SAMUEL BERNSTEIN, FREDERICK M. STRADER,
*Examiners.*